United States Patent Office 3,560,598
Patented Feb. 2, 1971

3,560,598
PROCESS FOR MAKING PLASTIC MULTIFOCAL LENSES
Charles W. Neefe, Box 361, Big Spring, Tex. 79720
Continuation-in-part of application Ser. No. 570,107, July 11, 1966. This application Oct. 11, 1968, Ser. No. 766,817
Int. Cl. B29d 11/00, 3/00
U.S. Cl. 264—1             1 Claim

ABSTRACT OF THE DISCLOSURE

A method for making monocentric bifocal contact lenses. The reading segment being composed of a material possessing a higher index of refraction than the material of the lens and being semi-circular in shape and the optical center of the reading segment located at the center of the upper straight edge of the semicircular reading segment.

This is a continuation in part of my previous application Ser. No. 570,107, filed July 11, 1966, now U.S. 3,440,306, for "A Process for Making an Improved Bifocal Lens."

Bifocal contact lenses composed of plastics of two different refractive indexes, as are now being made, have round segments with the optical center located at the geometric center of the reading segments. This causes a degree of image displacement due to the base down prism encountered with the transition from the distant segment to the near segment. This displacement requires reorientation and is a source of distraction. Also the upper edge of the segment is curved with a radius equal to the radius of the segment.

The herein disclosed bifocal contact lens overcomes these disadvantages. Using this process, any shape segment may be made and we will use the semicircle with a straight top as an example. It is understood that any segment shape is possible and any placement of the optical center is also possible with the present invention. It is desirable however to employ the monocentric design and place the optical center of the reading segment tangent to the upper straight edge of the semi-circular reading segment. Also many suitable types of plastics and adhesives may be substituted for the one stated herein.

Your attention is directed to the accompanying drawing, in which.

Figure 1:
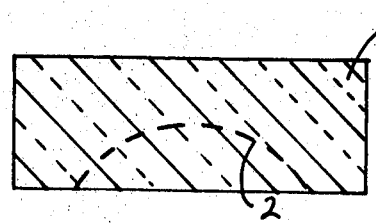
FIG. 1 shows the two plastic blocks in section with the optical surfaces polished.
Figure 1:

The process for making the monocentric lens will now be described in detail:

A concave radius 2, FIG. 1, is cut and polished in a block of low refractive index plastic such as methyl methacrylate. The block of plastic may be colored if a colored lens is desired.

A second block of plastic is provided composed of two refractive indexes, element 5, FIG. 1, being the lower refractive index and element 4, FIG. 1, being the higher refractive index. The demarcation line between the two different refractive index materials is a straight line passing through the geometric center of the block. Methyl methacrylate and styrene may be employed for the two materials of different refractive index. The block composed of two materials having different refractive indices may be fabricated by cementing together two pieces of the desired material or one piece of polymerized material such as polystyrene may be placed in a suitable container and a liquid monomer such as methyl methacrylate cast in the container and polymerized to complete the block.

A convex radius 3, FIG. 1, equal in radius to the concave radius 2, FIG. 1, is cut and polished on the block having two refractive materials 4 and 5, FIG. 1.

Figure 2:
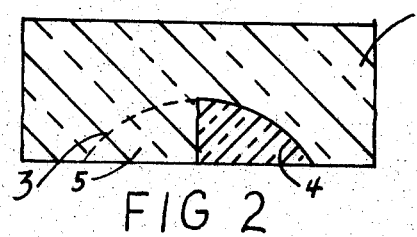
FIG. 2 shows the two plastic blocks in section bonded together.

The convex surface 3, FIG. 1, is placed in the concave depression 2, FIG 1, and permanently attached as shown in FIG. 2.

A variety of excellent adhesives are available to form the boundary film shown at 3, FIG. 2. Since the radius of the two surfaces are equal the cementing film is extremely thin. Optically the film is inert and has no effect whatsoever on the resulting optical properties of the finished lens. A cement having a refractive index equal to the larger element 1, FIG. 2, is preferred. Also, methyl methacrylate may be employed as a cement.

Ultrasonic energy may also be used to bond the two surfaces directly without an adhesive film. If high levels of ultrasonic energy is applied to two plastic pieces heat of fusion is rapidly generated at any junction. This process is well known and widely used in the plastic industry for assembling plastic parts.

Another very successful method of bonding the two surfaces requires the use of a polymer having a melting point below that of the materials used to make the lens. Polyamide resins have excellent adhesive qualities and low melting points. The heat to melt the adhesive may be produced by ultrasonic energy.

The completed lens blank, FIG. 2, has a high index segment 4, FIG. 2, embedded within a block of material having a lower refractive index.

Figure 3:
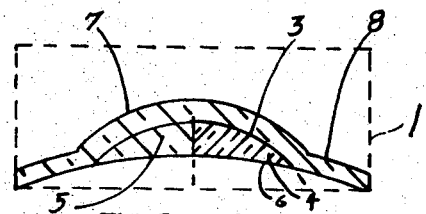
FIG. 3 shows a lens in section out from the plastic blocks.

The lens is now cut from this blank as shown in FIG. 3. The concave surface 6, FIG. 3, intersects all three pieces of the blanks 1, 4 and 5, FIG. 3. The convex surface intersects only one piece of the block material 1, FIG. 3.

If a colored material is used for the concave block 1, FIG. 2, and clear materials are used for parts 4 and 5, FIG. 2, it is possible to produce a bifocal, lenticular lens having a uniform color. The part 1, FIG. 3, having a uniform thickness results in a uniform color if the color is present only in part 1, FIG. 3.

This process produces lenses which are very stable and of excellent optical quality. Internal stress is eliminated since all parts are composed of cast and cured resins having no stress.

Figure 4:
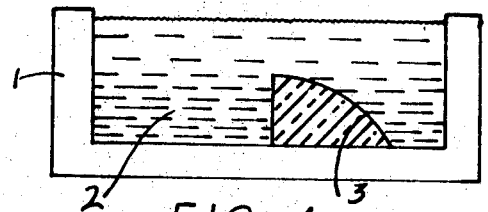
FIG. 4 shows a monomer cast in a mold, also shown in section.
Figure 5:
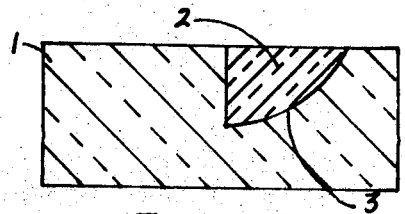
FIG. 5 is plastic block shown in section having a depression filled with liquid monomer.
Figure 6:
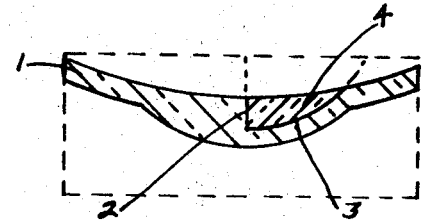
FIG. 6 is a lens blank in section composed of two plastics having different refractive indexes.

A method of producing inexpensive lenses of lesser quality employs casting a monomer such as methyl methacrylate 2, FIG. 4, over a curved optical surface 3, FIG. 4, within a container or mold 1, FIG. 4, and polymerizing the monomer to form a solid block 1, FIG. 5, having a curved depression 3, FIG. 5. The depression may be semi-circular in shape and has an optical surface 3, FIG. 5. The depression is filled with a high index monomer, such as styrene and polymerized to form a monolithic lens blank, FIG. 6, having a high index segment 4, FIG. 6, a low index segment 1, FIG. 6, a curved optical surface between the two refractive media 3, FIG. 6, and a straight side 2, FIG. 6. The optical center may be located at the center of the straight side 2, FIG. 6, to produce a monocentric flat top bifocal lens. Colored lenses may be produced by adding soluble colors to both materials before polymerization.

The optical center of the reading segment is located at the top of the reading segment. No apparent image displacement will be present during the transition from the distant to near segment if the optical center is located at the top edge of the reading segment.

Various modifications can be made without departing from the spirit of this invention or the scope of the appended claim. The constants set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description or shown in the accompanying drawings shall be interpreted as illustrative and not in a limiting sense.

I claim:

1. A method of making a monocentric bifocal contact lens comprising:

filling an open topped mold cavity with methyl methacrylate liquid monomer which is capable of polymerization, the mold having a projection from the bottom of the mold, said projection having a convex optical surface in the configuration of a flat-faced spherical segment, completing polymerization of the monomer to form a solid resinous material having a relatively low refractive index, removing the polymerized solid resinous material from the mold cavity and the projection such that a depression exists in the solid resinous material having substantially the same shape and surface radius as the convex optical surface present within the mold cavity, said depression having a concave optical surface extending to an edge tangent to the optical center of said optical surface, filling the concave depression with a liquid monomer comprising styrene having a relatively high refractive index when polymerized, polymerizing the liquid monomer to form a solid monolithic mass and constructing a monocentric bifocal contact lens by forming on the low refractive index material a major convex surface which has an optical center located adjacent the optical center of the high refractive index portion.

References Cited

UNITED STATES PATENTS

| | | | |
|---|---|---|---|
| 2,241,415 | 5/1941 | Moulton | 264—1 |
| 3,034,403 | 5/1962 | Neefe | 264—1 |
| 3,109,696 | 11/1963 | Whitney | 264—1 |
| 3,270,099 | 8/1966 | Camp | 264—1 |
| 3,297,422 | 1/1967 | Emerson et al. | 264—1 |
| 3,396,214 | 8/1968 | Crandon | 264—1 |
| 3,431,327 | 3/1969 | Tsuetaki | 351—161 |
| 2,279,208 | 4/1942 | Shaw | 264—245 |

FOREIGN PATENTS

| | | | |
|---|---|---|---|
| 612,454 | 11/1948 | Great Britain | 264—246 |

JULIUS FROME, Primary Examiner

A. H. KOECKERT, Assistant Examiner

U.S. Cl. X.R.

264—162, 250

PO-1050
(5/69)

UNITED STATES PATENT OFFICE
CERTIFICATE OF CORRECTION

Patent No. 3,560,598          Dated February 2, 1971

Inventor(s) C. W. Neefe

It is certified that error appears in the above-identified patent and that said Letters Patent are hereby corrected as shown below:

Col. 1, line 58, after "Fig. 5 is" insert --a--.
Col. 3, lines 19 and 20, "methyl methacrylate liquid monomer should be --liquid methyl methacryl monomer--.
Col. 4, line 9, after "convex" insert --optical--.

Signed and sealed this 13th day of July 1971.

(SEAL)
Attest:

EDWARD M. FLETCHER, JR.          WILLIAM E. SCHUYLER, JR.
Attesting Officer                 Commissioner of Patents